United States Patent
Bodnaruk et al.

(10) Patent No.: US 12,549,417 B2
(45) Date of Patent: Feb. 10, 2026

(54) SLICERS AND TEMPERATURE OFFSET CANCELATION CIRCUITS FOR DECISION FEEDBACK EQUALIZERS

(71) Applicant: Cypress Semiconductor Corporation, San Jose, CA (US)

(72) Inventors: Nicholas Bodnaruk, Sunnyvale, CA (US); Soon-Gil Jung, Santa Clara, CA (US); Gary Miller, Corbett, OR (US); Sai Goutham Sunkara, San Jose, CA (US); Anthony Sanders, Weißenfeld (DE)

(73) Assignee: Infineon Technologies Americas Corp., El Segundo, CA (US)

( * ) Notice: Subject to any disclaimer, the term of this patent is extended or adjusted under 35 U.S.C. 154(b) by 111 days.

(21) Appl. No.: 18/647,959

(22) Filed: Apr. 26, 2024

(65) Prior Publication Data
US 2025/0337620 A1    Oct. 30, 2025

(51) Int. Cl.
*H04L 25/03* (2006.01)

(52) U.S. Cl.
CPC .. *H04L 25/03267* (2013.01); *H04L 25/03057* (2013.01); *H04L 25/03885* (2013.01); *H04L 2025/0349* (2013.01)

(58) Field of Classification Search
CPC ......... H04L 25/03057; H04L 25/03267; H04L 25/03885
USPC ....................................................... 375/262
See application file for complete search history.

(56) References Cited

U.S. PATENT DOCUMENTS

| 7,109,697 | B1 | 9/2006 | Atrash et al. | |
|---|---|---|---|---|
| 2009/0310666 | A1* | 12/2009 | Yamaguchi | H04B 3/145 375/232 |
| 2010/0008002 | A1* | 1/2010 | Sorgeloos | H10D 89/713 257/173 |

OTHER PUBLICATIONS

Yong-Hun Kim, et al., "A 20 Gbps 1-Tap Decision Feedback Equalizer with Unfixed Tap Coefficient" , Dept. of Electrical Engineering Kaist, IEEE, 2012, 4 pages.
Chi-Hang Chan, et al., "A Reconfigurable Low-Noise Dynamic Comparator with Offset Calibration in 90nm CMOS", IEEE Asian Solid-State Circuits Conference, 2011, 4 pages.
Daniel Schinkel, et al., "A Double-Tail Latch-Type Voltage Sense Amplifier with 18ps Setup+Hold Time", ISSCC 2007, SESSION 17, Analog Techniques and PLLs, 17.7, University of Twente, 2007 IEEE International Solid-State Circuits Conference, 2007, 3 pages.

(Continued)

*Primary Examiner* — Leila Malek

(57) ABSTRACT

A slicer of a decision feedback equalizer (DFE) comprises an integrator circuit, a regenerator circuit coupled to the integrator circuit, and a temperature offset cancelation circuit coupled to the regenerator circuit. The integrator circuit comprises a first transistor associated with a first temperature-dependent beta value. The temperature offset cancelation circuit comprises a second transistor associated with a second temperature dependent beta value, a pair of first and second resistors, and a third transistor coupled to the pair of first and second resistors. The first resistor is coupled to the second transistor. The pair of first and second resistors is to modify the second temperature-dependent beta value to correspond to the first temperature-dependent beta value of the first transistor. The third transistor is to provide a bias current for biasing the first transistor.

20 Claims, 5 Drawing Sheets

(56) References Cited

OTHER PUBLICATIONS

Vladimir Stojanovic, et al., "Autonomous Dual-Mode (PAM2/4) Serial Link Transceiver With Adaptive Equalization and Data Recovery", IEEE Journal of Solid-State Circuits, vol. 40, No. 4, Apr. 2005, 15 pages.

Rahul Jain, et al., "Design of Low-Power High-Speed Double-Tail Dynamic CMOS Comparator using Novel Latch Structure", 2017 4th IEEE Uttar Pradesh Section International Conference on Electrical, Computer and Electronics (UPCON), 2017, 6 pages.

Yong Liu, et al., "A 10Gb/s compact low-power serial I/O with DFE-IIR equalization in 65nm CMOS", SSCC 2009, SESSION 10, MULTI-GB/s Serial Links and Building Blocks, 10.2, iBM T.J. Watson Research Center, massachusetts Institute of Technology, 2009 IEEE International Solid-State Circuits Conference, 2009, 3 pages.

Samaneh Babayan-Mashhadi, et al., "Analysis and Design of a Low-Voltage Low-Power Double-Tail Comparator", IEEE Transactions on Very Large Scale Integration (VLSI) Systems, vol. 22, No. 2, Feb. 2014, 2013, 10 pages.

Matt Park, et al., "A 7Gb/s 9.3mW 2-Tap Current-Integrating DFE Receiver", ISSCC 2007, SESSION 12, GIGABIT CDRs And Equalizers, 12.5, Massachusetts Institute of Technology, IBM, 2007 IEEE International Solid-State Circuits Conference, 2007, 3 pages.

\* cited by examiner

SLICERS AND TEMPERATURE OFFSET CANCELATION CIRCUITS FOR DECISION FEEDBACK EQUALIZERS

TECHNICAL FIELD

Aspects and embodiments of the present disclosure relate to serialization/deserialization (SERDES) systems, and in particular to slicers and temperature offset cancelation circuits for decision feedback equalizers.

BACKGROUND

Serialization/deserialization (SERDES) techniques enable devices to exchange data over serial data links. An example SERDES system may include a transmitter to convert parallel data into a serial data signal, a transmission channel to carry the serial data signal, and a receiver to convert the serial data signal back into parallel data. Examples of communications protocols that may use SERDES techniques include Universal Serial Bus (USB), Ethernet, Peripheral Component Interconnect Express (PCIe), and others.

BRIEF DESCRIPTION OF DRAWINGS

Various embodiments in accordance with the present disclosure will be described with reference to the drawings, in which.

DETAILED DESCRIPTION

Figure 1:
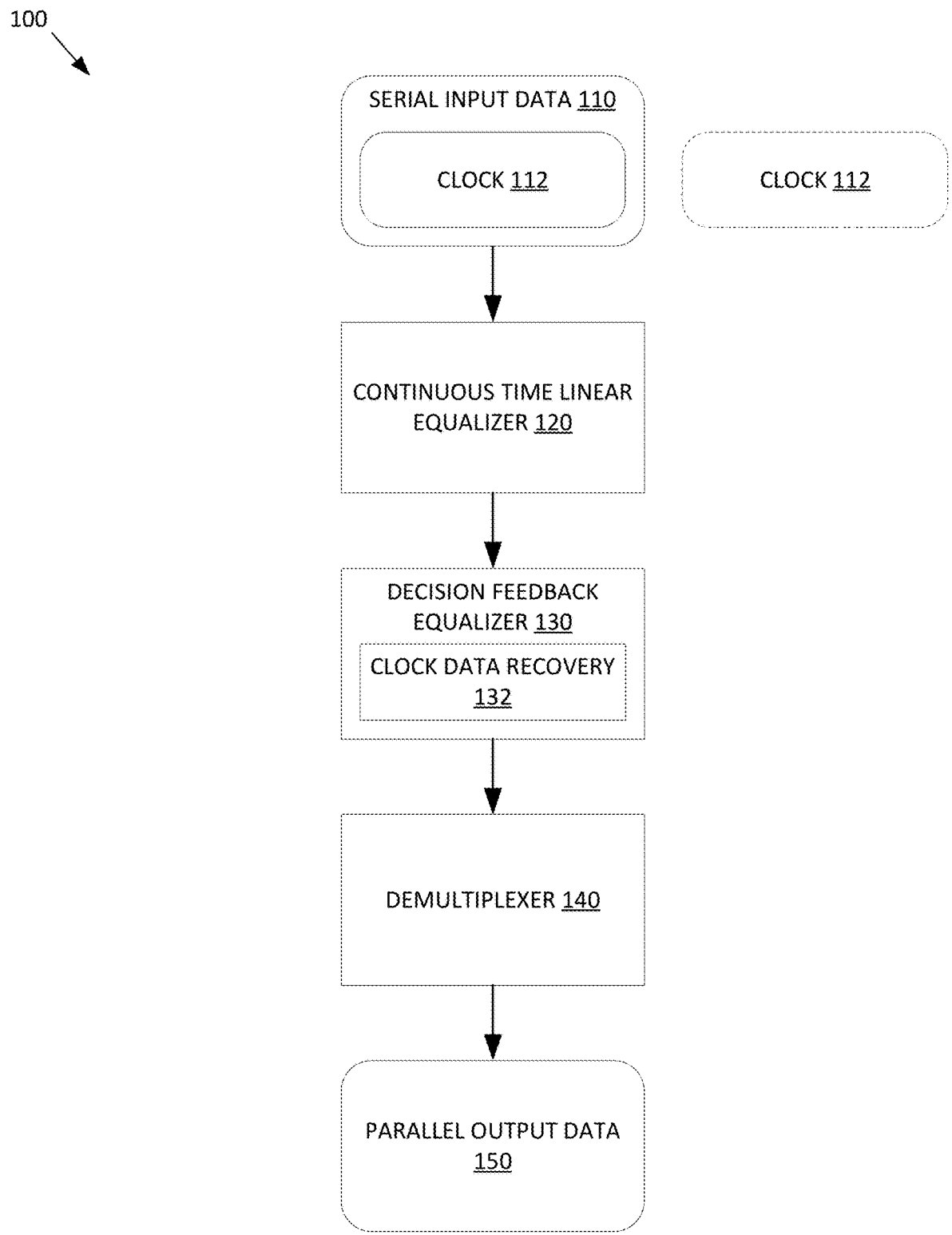
FIG. 1 is a block diagram of an example SERDES receiver for deserializing serial input data to obtain parallel output data, in accordance with an embodiment.

Aspects of the present disclosure relate to slicers and temperature offset cancelation circuits for decision feedback equalizers (DFEs). SERDES receivers may include a variety of subsystems for processing serial data streams. For example, a SERDES receiver may include a DFE to compensate for inter-symbol interference (ISI) and quantize the data stream into symbols. A DFE may include one or more slicers to sample the data stream and one or more summers to add feedback from the slicers to the data stream.

SERDES receivers may face challenges related to driving slicers in high-frequency, low-power, and/or small-area systems, such as in Physical Layers (PHYs) for high-frequency serial links operating at 5-10 gigabits per second (e.g., USB). In such systems, a DFE summer may driver multiple slicers of different types. For example, a DFE summer may drive an edge slicer, a data slicer, an error slicer, and a roam slicer. The multiple slicers may excessively load the summer output, which may necessitate the addition of amplifiers between summers and slicers in some systems. As a result, these systems may experience increased power consumption and silicon area consumption dedicated to the amplifiers.

SERDES receivers may face further challenges related to tracking and canceling temperature-dependent offsets in slicer circuits, such as temperature-dependent offsets in a first stage (e.g., an integrator stage) of a slicer circuit. Some systems may include temperature offset cancelation in the first stage, which may require significant current to operate, and which may result in larger devices due to summer loading or other causes.

Aspects of the present disclosure address the above challenges and other challenges by using temperature offset cancelation circuits in a second stage (e.g., a regenerator stage) of a slicer circuit and/or smaller slicer input devices to reduce summer loading. An example system may include one or more of the following aspects: (i), a temperature offset cancelation circuit with a modified temperature-dependent beta value, (ii) a slicer having small input devices in a first stage and a temperature offset cancelation circuit in a second stage with isolation circuits between the first and second stages, or (iii) a Universal Serial Bus (USB) Physical Layer (PHY) receiver with slicers and temperature offset cancelation circuits having the above characteristics. These aspects are further described below.

In an embodiment, a system includes a temperature offset cancelation circuit with a transistor and a pair of resistors. The transistor may be associated with a temperature-dependent beta value. The resistors may be tuned to modify the temperature-dependent beta value of the transistor to track a temperature offset of another circuit. The temperature offset cancelation circuit may use these and other components to generate a bias current for biasing the other circuit.

In an embodiment, a system includes a slicer having small input devices in a first stage of the slicer, which may load a summer less than a threshold loading value. Thus, amplification of the summer output to accommodate multiple slicers may be unnecessary, and power and area requirements may be reduced. The slicer may further have a temperature offset cancelation circuit in a second stage of the slicer, which may provide a wide range of achievable offset compensation without loading the summer. The slicer may also have isolation devices between the temperature offset cancelation of the second stage and the small input devices of the first stage, which may further enhance gain.

In an embodiment, a system includes a USB PHY receiver with a DFE having slicers and temperature offset cancelation circuits as described above, which enables the USB PHY to have a smaller DFE than may otherwise be achievable for the reasons given above. Thus, the USB PHY may use less silicon and less power than other designs.

Serdes Receivers

FIG. 1 is a block diagram of an example SERDES receiver 100 for deserializing serial input data 110 to obtain parallel output data 150, in accordance with an embodiment. SERDES receiver 100 includes continuous-time linear equalizer (CTLE) 120, decision feedback equalizer (DFE) 130, and demultiplexer 140. In various embodiments, SERDES receiver 100 may include more, fewer, or different components than those depicted in FIG. 1, and the components may process input data 110 in a different order than depicted in FIG. 1.

SERDES receiver 100 may be associated with a corresponding SERDES transmitter (not depicted). The transmitter may serialize a plurality of input symbols and provide pre-amplification and other functions. SERDES receiver 100 may further be associated with a transmission channel (not depicted), such as a copper cable, optical fiber, or similar. The transmission channel may induce a loss on carried signals that varies with frequency. For example, the transmission channel may cause increased loss at high frequencies (e.g., near the Nyquist frequency) relative to low frequencies (e.g., near DC). In an example of the above components, a Universal Serial Bus (USB) system may include a USB transmitter, a USB receiver, and a USB cable (transmission channel). USB systems are further described with reference to FIG. 5.

Serial input data 110 may correspond to a voltage signal, current signal, optical signal, or other type of signal. The signal may be singled-ended or differential in various embodiments. For example, serial input data 110 may be a low-voltage differential signal (LVDS). Serial input data 110 may be associated with clock signal 112 having a fixed frequency value (e.g., measured in kilohertz, megahertz, gigahertz, etc.). In some embodiments, clock signal 112 may be embedded in serial input data 110 (indicated by solid outline), while in other embodiments, clock signal 112 may be a separate signal (indicated by dashed outline). Serial input data 110 may further be associated with channel losses due to characteristics of the transmission channel described above.

CTLE 120 modifies serial input data 110 to provide an equalizing gain that amplifies the incoming signal and/or offsets frequency-dependent losses of the transmission channel. For example, CTLE 120 may provide frequency-independent gain to the whole signal and/or frequency-dependent boost to higher-frequency components associated with increased loss in the transmission channel. Thus, CTLE 120 may approximate an inverse of the transmission channel loss. CTLE 120 may include one or more stages of equalizer core cells to affect the overall desired gain characteristics of CTLE 120.

DFE 130 quantizes the output of CTLE 120 into symbols and further equalizes the output of CTLE 120 by canceling inter-symbol interference (ISI). DFE 130 may use clock signal 112 to sample the output of CTLE 120. In various embodiments, clock signal 112 may be used directly if separate from serial input data 110, or clock signal 112 may be recovered using clock data recovery component 132. DFE 130 may include one or more slicers for making symbol decisions, and one or more summers for adding slicer output to the incoming signal as feedback to cancel ISI. DFEs are further described with reference to FIG. 2A. Slicers are further described with reference to FIG. 3.

Demultiplexer 140 converts a serial stream of symbols output by DFE 130 into separate data lines each corresponding to a symbol's relative position in the stream. Demultiplexer 140 may be associated with a width value (e.g., 8, 16, 32) corresponding to the number of data lines and the number of symbols processed at a time. Demultiplexer 140 may be associated with a clock input (e.g., clock signal 112) and may provide a fractional clock output related to the width. Demultiplexer 140 may include a shift register with the number of flip-flops equal to the width value.

Parallel output data 150 may correspond to a plurality of symbols (e.g., bits) represented in serial input data 110. The symbols may be stored in a register, buffer, memory, or other type of storage, or may be retransmitted on a parallel channel. The symbols may be associated with a width, such as a byte, half-word, word, or similar. The width may correspond to a width of demultiplexer 140. Parallel data 510 may further be associated with clock value (not depicted), which may be a fraction of clock signal 112 determined by the width.

Decision Feedback Equalizers

Figure 2:
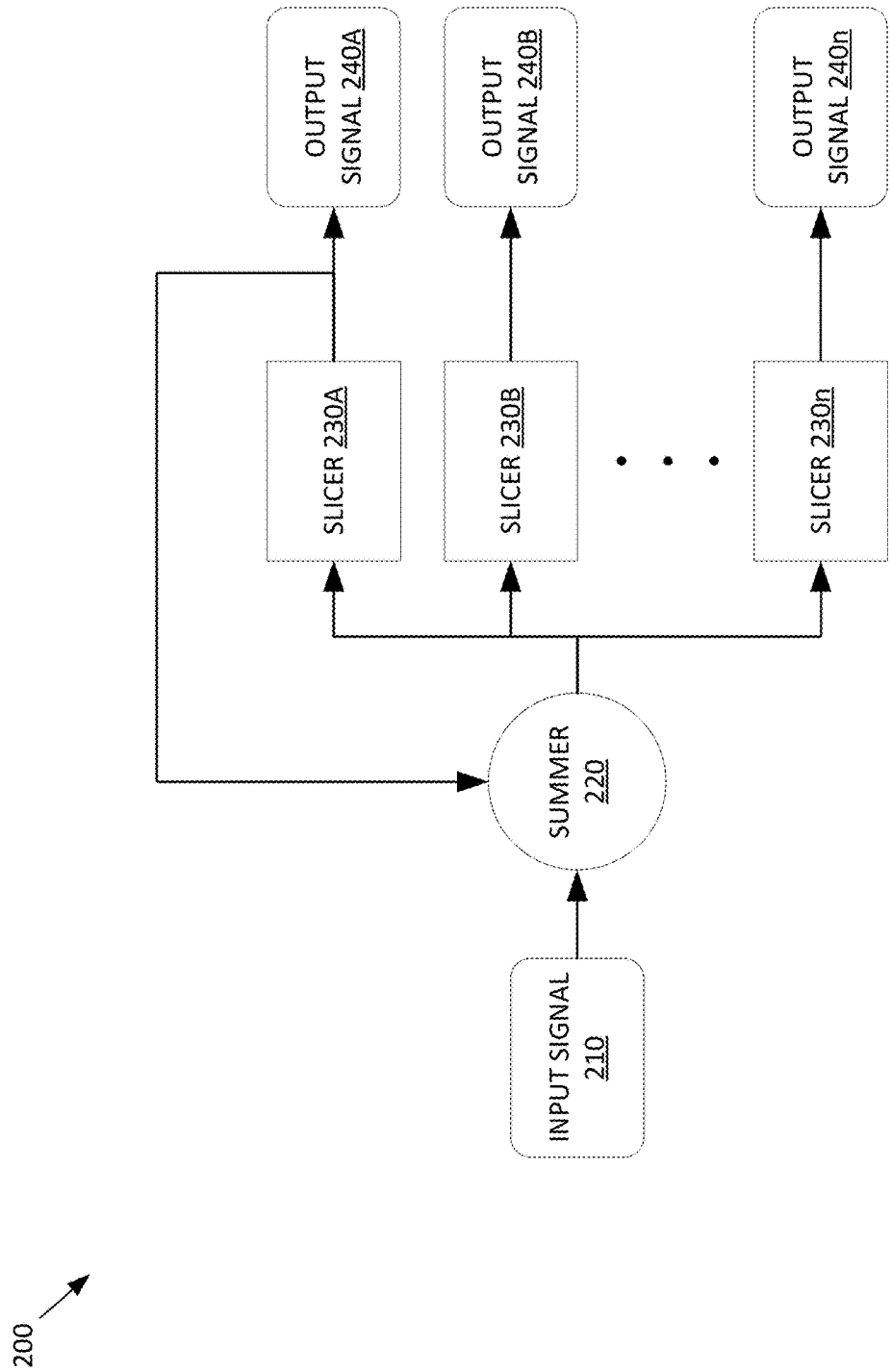
FIG. 2 is a block diagram of an example decision feedback equalizer (DFE) 200 for amplifying, equalizing, and/or quantizing input signal, in accordance with an embodiment.

FIG. 2 is a block diagram of an example decision feedback equalizer (DFE) 200 for amplifying, equalizing, and/or quantizing input signal 210, in accordance with an embodiment. DFE 200 includes summer 220 and slicers 230A-n producing output signals 240A-n. In various embodiments, DFE 200 may include more, fewer, or different components than those depicted in FIG. 2, and the components may process input signal 210 in a different order than depicted in FIG. 2. In an embodiment, DFE 200 is DFE 130 of SERDES receiver 100 of FIG. 1.

Input signal 210 may correspond to serial input data 110 of FIG. 1. As described with reference to serial input data 110, input signal 210 may be a voltage signal or other type of signal and may be single-ended or differential (e.g., an LVDS signal). Input signal 210 may be associated with a separate clock signal or may embed a clock signal.

Summer 220 may sum input signal 210 with one or more feedback signals. Summer 220 may include a driver for driving one or more slicers or other loads. The driver may be associated with a threshold loading value, beyond which summer 220 may be unable to perform within specifications. For example, a threshold loading value may be 10 femtofarads, and summer 220 may function within specifications for loading values below this threshold. Other summers may have threshold loading values higher or lower than this threshold in various embodiments. In an embodiment, summer 220 may sum one or more signals from an external DFE. For example, in a half-rate DFE system, two DFEs may operate on odd and even clock cycles, respectively. A summer of one DFE may receive and sum one or more signals from the other DFE.

Slicers 230A-n may amplify, equalize, and/or quantize the output of summer 220 to generate respective output signals 240A-n. Each of slicers 230A-n may be associated with different parameters enabling slicers 230A-n to perform different functions. For example, slicer 230A may be an edge slicer, slicer 230B may be a data slicer, slicer 230C (not depicted) may be an error slicer, and slicer 230n may be a roam slicer. Each slicer may be sensitive to different system parameters. For example, error and roam slicers may be sensitive to temperature offset and may thus benefit from temperature offset cancelation. Slicers 230A-n may drive additional circuitry such as clock data recovery (CDR) circuitry (e.g., clock data recovery 132), a demultiplexer (e.g., demultiplexer 140), etc. One or more of slicers 230A-n may further drive summer 220 to provide negative feedback. For example, slicer 230A may provide negative feedback, while slicers 240B-n may not. Slicers are further described below with reference to FIG. 3.

Slicers

Figure 3:
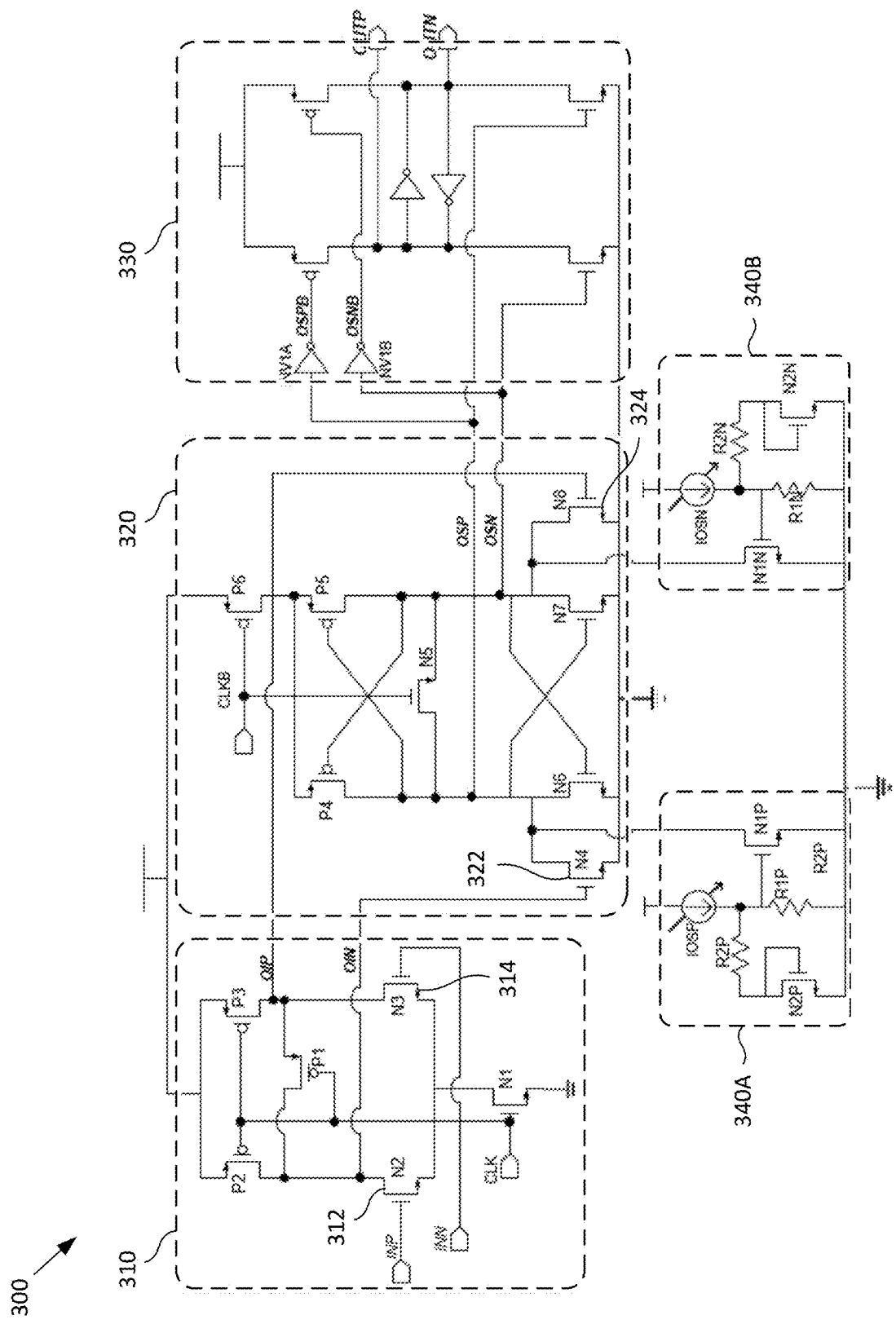
FIG. 3 is a circuit diagram of an example slicer having a temperature offset cancelation circuit in a second stage, in accordance with an embodiment.

FIG. 3 is a circuit diagram of an example slicer 300 having a temperature offset cancelation circuit in a second stage, in accordance with an embodiment. Slicer 300 includes first stage 310, second stage 320 coupled to first stage 310, third stage 330 couped to second stage 320, and temperature offset cancelation circuits 340A-B coupled to second stage 320. In various embodiments, slicer 300 may include more, fewer, or different components than those depicted in FIG. 3. In an embodiment, slicer 300 corresponds to one or more of slicers 230A-n of FIG. 2.

In an embodiment, first stage 310 is an integrator circuit. First stage 310 includes input transistors 312-314, which may be a differential pair. Each of transistors 312-314 may be associated with respective temperature-dependent beta values or other temperature-dependent parameters. Each of transistors 312-314 may be smaller than other transistors in slicer 300 or other circuits, which may provide reduced loading on a summer or other input circuit. For example, each of transistors 312-314 may have a width parameter of 2 µm or less, and a length parameter of 55 nm or less. These values are merely provided as examples, and various embodiments may have widths and/or lengths greater than these values. Parameters for transistors 312-314 may be chosen to provide negligible loading on an input circuit, such as a summer. A threshold loading value may be determined for the input circuit using analytical, computational, or experimental techniques, and transistors 312-314 may be allocated a portion of the threshold value. For example, if a summer is loaded by four slicers, each slicer's respective input transistors may be allocated one fourth of the threshold value. Each input transistor may then be designed to provide a load less than its allocated threshold loading value.

In an embodiment, second stage 320 is a regenerator circuit. Second stage 320 includes isolation transistors 322-324. Transistor 322 is coupled to transistor 312 of first stage 310 and to temperature offset cancelation circuit 340A. Similarly, transistor 324 is coupled to transistor 314 of first stage 310 and to temperature offset cancelation circuit 340B. Each of isolation transistors 312-314 isolates second stage 320 from first stage 310, which may enhance gain while reducing loading on a summer or other input circuit. Furthermore, isolation transistors 322-324 may enable temperature offset cancelation for transistors 312-314 to be located in second stage 320.

In an embodiment, third stage 330 may be an RS latch and driver circuit. Third stage 330 may driver additional circuitry, such as a clock data recovery circuit. Third stage 330 may further driver a DFE summer to provide negative feedback.

In an embodiment, temperature offset cancelation circuits 340A-B may provide temperature offset cancelation for transistors 312-314 of first stage 310. Temperature offset cancelation circuits are further described below with reference to FIGS. 4A-B.

Temperature Offset Cancelation

Figure 4B:
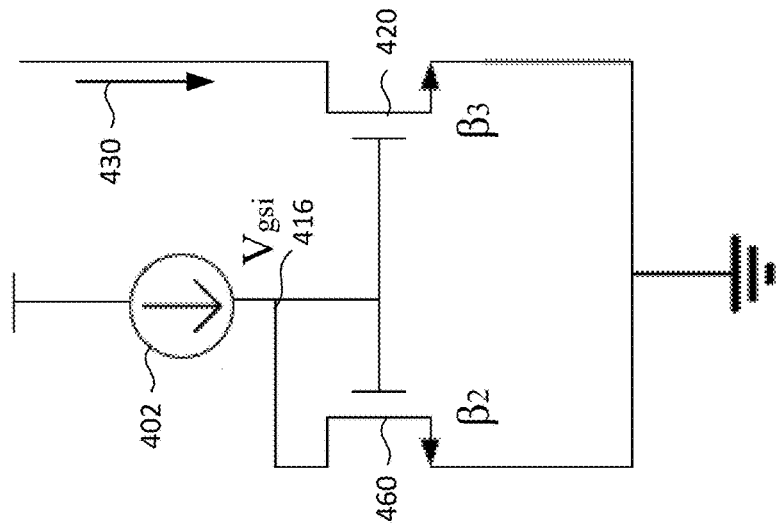
FIG. 4B is a circuit diagram of an example approximation of a temperature offset cancelation circuit, in accordance with an embodiment.
Figure 4A:
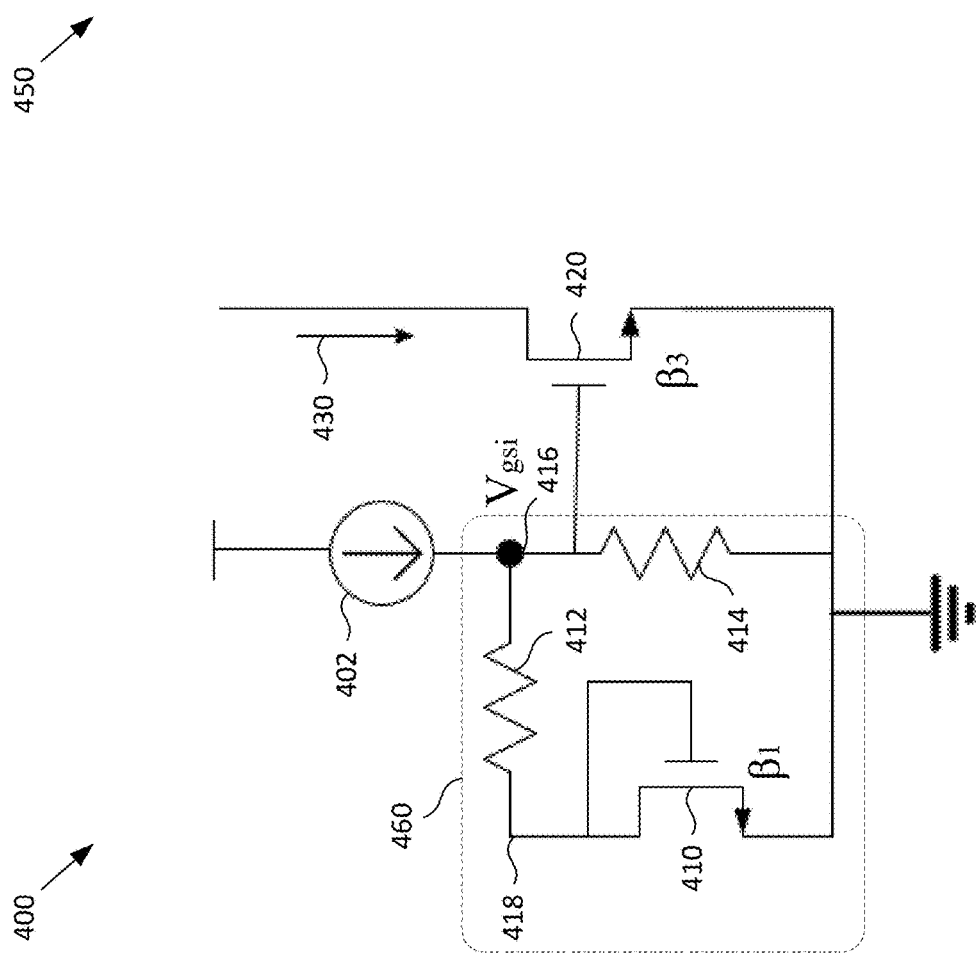
FIG. 4A is a circuit diagram of an example temperature offset cancelation circuit, in accordance with an embodiment.

FIG. 4A is a circuit diagram of an example temperature offset cancelation circuit 400, in accordance with an embodiment. Temperature offset cancelation circuit 400 includes current source 402, transistor 410, resistor 412, resistor 414, and transistor 420. In various embodiments, temperature offset cancelation circuit 400 may include more, fewer, or different components than those depicted in FIG. 4A. In an embodiment, temperature offset cancelation circuit 400 corresponds to temperature offset cancelation circuit 340A of FIG. 3.

In an embodiment, resistor 412 is coupled to transistor 410, and the pair of resistors 412 and 414 are coupled to transistor 420 and current source 402. For example, as depicted in FIG. 4A, source terminals of transistors 410 and 420 are coupled to each other and to resistor 414 at a ground reference node. A gate terminal of transistor 410 is coupled to a drain terminal of transistor 410 and to resistor 412. A gate terminal of transistor 420 is coupled to resistors 412-414 and current source 402. A drain terminal of transistor 420 is coupled to an output branch and provides bias current 430.

In an embodiment, transistor 410 is an n-type metal-oxide-semiconductor (NMOS) transistor with a beta value $\beta_1$, which may be a temperature-dependent beta value, and which may be the same as or different than a beta value of a transistor for which temperature offset cancelation circuit 400 provides temperature offset cancelation (e.g., transistor 312 of FIG. 3). Similarly, transistor 420 is an NMOS transistor with a beta value $\beta_3$, which may be a temperature-dependent beta value, and which may be the same as or different than $\beta_1$ or the beta value of the transistor for which temperature offset cancelation circuit 400 provides temperature offset cancelation. In various embodiments, transistors 410 and 420 may be other types of transistors, such as p-type MOS (PMOS) transistors, junction field-effect transistors (JFETs), or bipolar junction transistors (BJTs). Similarly, the transistor for which temperature offset cancelation circuit 400 provides temperature offset cancelation may be another type of transistor. Temperature offset cancelation circuit 400 may be modified to operate with or for different types of transistors.

Referring to FIG. 4B, current mirror equivalent circuit 450 is an approximate simplification of temperature offset cancelation circuit 400 of FIG. 4A. Equivalent circuit 450 similarly includes input current source 402 and transistor 420. Transistor 410 and resistors 412-414 of FIG. 4A may be approximated by transistor 460 of FIG. 4B. Input current source 402 may be static or adjustable current source (e.g., a programmable current source controlled by firmware), such as a voltage source with a single resistor or a resistor network to provide static or adjustable current. Bias current 430 may be used to bias the transistor for which circuits 400 and 450 provide temperature offset cancelation (e.g., via an isolation transistor such as transistor 322 of FIG. 3).

As a current mirror, equivalent circuit 450 may reproduce a current of current source 402, or proportion thereof, as bias current 430. The proportion may be dependent on respective characteristics of transistors 420 and 460 relative to each other (e.g., relative width-length (W/L) ratios, beta values, etc.). For example, an input current $I_i$ corresponding to input current source 402 and an output current $I_o$ corresponding to bias current 430 may be determined by:

$$I_i = \beta_2(V_{gsi} - V_t)^2, \text{ and}$$

$$I_o = \beta_3(V_{gsi} - V_t)^2,$$

where $V_{gsi}$ corresponds to node 416 (e.g., gate-source voltages of transistors 420 and 460), and $V_t$ corresponds to a threshold voltage of transistors 410, 420, and 460. Bias current 430 may thus be related to current source 402 by:

$$I_o = \frac{\beta_3}{\beta_2} I_i.$$

Referring to FIG. 4A, approximated transistor 460 includes transistor 410 and resistors 412-414. Input current $I_i$ is thus a sum of two branch currents $I_1$ and $I_2$ associated with resistors 412 ($R_1$) and 414 ($R_2$), respectively:

$$I_1 = \beta_1(V_{gs1} - V_t)^2, \text{ and}$$

$$I_2 = \frac{V_{gsi}}{R_2},$$

where $V_{gs1}$ corresponds to node 418 (e.g., gate-source voltage of transistor 410). $V_{gsi}$ and $V_{gs1}$ may be related by:

$$V_{gsi} = I_I R_1 + V_{gs1}.$$

The above relations may be substituted to determine input current $I_i$:

$$I_i = \beta_1 \left( -R_1 \left( I_i - \frac{V_{gsi}}{R_2} \right) + V_{gsi} - V_t \right)^2 + \frac{V_{gsi}}{R_2},$$

which may be simplified using approximations to:

$$I_i = \beta_1 \left( -V_t + \frac{V_{gsi}(R_1 + R_2)}{R_2} \right)^2.$$

$V_{gsi}$ may be made substantially larger than $V_t$ via the quotient of the sum of $R_1$ and $R_2$ over $R_2$. (e.g., scaled $V_{gsi}$ equal to or greater than 8/3 $V_t$), and thus $V_t$ may be ignored. $\beta_1$ is then effectively increased by the quotient of the sum of $R_1$ and $R_2$ over $R_2$. Thus, $\beta_2$ may be approximated by:

$$\beta_2 = \beta_1 \frac{(R_1 + R_2)}{R_2}.$$

The above formulation of $\beta_2$ as a product of $\beta_1$ and the quotient of the sum of $R_1$ and $R_2$ over $R_2$. is approximate and may be derived using other methods. Referring to FIG. 4B, $\beta_2$ may be modified using $R_1$ and $R_2$ to achieve a desired imbalance with $\beta_3$ and set the temperature dependence of circuit 400. Thus, circuit 400 may track a temperature offset of another circuit for which circuit 400 is tuned to provide temperature offset cancelation. For example, $\beta_2$ may be modified to correspond to a beta value of transistor 312 of FIG. 3. Values for $R_1$ and $R_2$ may be determined using analytical, computational, or experimental techniques in various embodiments. Other types of circuits not depicted in FIGS. 4A-B may be used in various embodiments to similar effect.

In an embodiment, circuit 400 may be duplicated to provide temperature offset cancelation for two transistors of a differential pair (e.g., transistors 312 and 314 of FIG. 3). Similarly, in an embodiment, circuit 400 may be duplicated to provide temperature offset cancelation for multiple transistors of various circuits (e.g., transistors of each of slicers 230A-n of FIG. 2). In these embodiments, respective pairs of resistors $R_1$ and $R_2$ of each circuit 400 may be tuned independently from or together with other circuits 400.

Universal Serial Bus Systems

Figure 5:
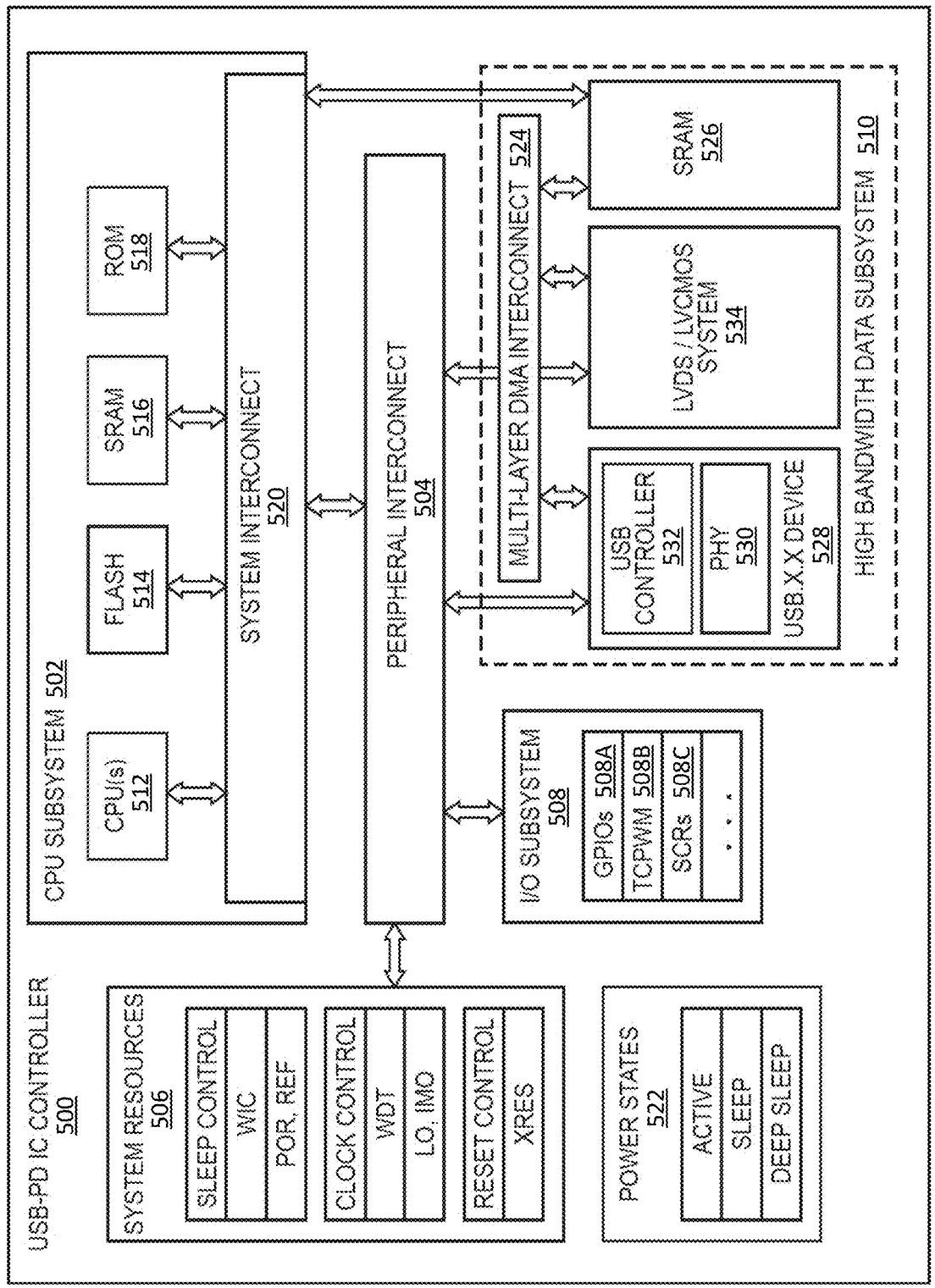
FIG. 5 illustrates an embodiment of a Universal Serial Bus (USB) integrated circuit (IC) controller such as a USB 3.1/3.2 high-speed data controller, in accordance with an embodiment.

FIG. 5 illustrates an embodiment of a Universal Serial Bus (USB) integrated circuit (IC) controller 500 such as a USB 3.1/3.2 high-speed data controller, in accordance with an embodiment. USB IC controller 500 may be implemented as a single-chip IC controller manufactured on a semiconductor die. In another example, USB IC controller 500 may be a single-chip IC that is manufactured as a System-on-Chip (SoC). In other embodiments, USB IC controller 500 may be a multi-chip module encapsulated in a single semiconductor package.

USB IC controller 500 includes CPU (Central Processing Unit) subsystem 502, peripheral interconnect 504, system resources 506, input/output (I/O) subsystem 508, high bandwidth data subsystem 510, and various terminals (e.g., pins) that are configured for receiving and sending signals.

CPU subsystem 502 may include one or more CPUs 512, flash memory 514, SRAM (Static Random Access Memory) 516, ROM (Read Only Memory) 518, etc. that are coupled to system interconnect 520. Each CPU 512 is a suitable processor that can operate in an IC or a SoC device. Flash memory 514 is non-volatile memory (e.g., NAND flash, NOR flash, etc.) that is configured for storing data, programs, and/or other firmware instructions. Flash memory 514 is tightly coupled within CPU subsystem 502 for improved access times. SRAM 516 is volatile memory that is configured for storing data and firmware instructions accessed by each CPU 512. ROM 518 is read-only memory (or other suitable storage medium) that is configured for storing boot-up routines, configuration parameters, and other firmware parameters and settings. System interconnect 520 is a system bus (e.g., a single-level or multi-level Advanced High-Performance Bus, or AHB) that is configured as an interface that couples the various components of CPU subsystem 502 to each other, as well as a data and control interface between the various components of CPU subsystem 502 and peripheral interconnect 504.

Peripheral interconnect 504 is a peripheral bus (e.g., a single-level or multi-level AHB) that provides the primary data and control interface between CPU subsystem 502 and its peripherals and other resources, such as system resources 506, I/O subsystem 508, and high bandwidth data subsystem 510. Peripheral interconnect 504 may include various controller circuits (e.g., direct memory access (DMA) controllers), which may be programmed to transfer data between peripheral blocks without burdening CPU subsystem 502. In various embodiments, each of the components of CPU subsystem 502 and peripheral interconnect 504 may be different with each choice or type of CPU, system bus, and/or peripheral bus.

System resources 506 include various electronic circuits that support the operation of USB IC controller 500 in its various states and modes. For example, system resources 506 may include a power subsystem having analog and/or digital circuits required for each controller state/mode such as, for example, sleep control circuits, wake-up interrupt controller (WIC), power-on-reset (POR), voltage and/or current reference (REF) circuits, etc. In some embodiments, the power subsystem may also include circuits that allow USB IC controller 500 to draw and/or provide power from/to external sources with several different voltage and/or current levels and to support controller operation in several power states 522 (e.g., such as active state, sleep state, and a deep sleep state with clocks turned off). Further, in some embodiments CPU subsystem 502 may be optimized for low-power operation with extensive clock gating and may include various internal controller circuits that allow CPU subsystem 502 to operate in the various power states 522. For example, CPU subsystem 502 may include a wake-up interrupt controller that is configured to wake CPU subsystem 502 from a sleep state, thereby allowing power to be switched off when the IC chip is in the sleep state. System resources 506 may also include a clock subsystem having analog and/or digital circuits for clock generation and clock management such as, for example, clock control circuits, watchdog timer (WDT) circuit(s), internal low-speed oscillator (ILO) circuit(s), and internal main oscillator (IMO) circuit(s), etc. System resources 506 may also include analog and/or digital circuit blocks that provide reset control and support external reset (XRES).

I/O subsystem 508 includes several different types of I/O blocks and subsystems. For example, I/O subsystem 508 includes GPIO (general purpose input output) blocks 508A, TCPWM (timer/counter/pulse-width-modulation) blocks 508B, and SCBs (serial communication blocks) 508C. GPIOs 508A include analog and/or digital circuits configured to implement various functions such as, for example, pull-ups, pull-downs, input threshold select, input and output buffer enabling/disabling, multiplex signals connected to various I/O pins, etc. TCPWM blocks 508B include analog and/or digital circuits configured to implement timers, counters, pulse-width modulators, decoders, and various other analog/mixed signal elements that are configured to operate on input/output signals. SCBs 508C include analog and/or digital circuits configured to implement various serial communication interfaces such as, for example, I2C (inter-integrated circuit), SPI (serial peripheral interface), UART (universal asynchronous receiver/transmitter), CAN (Controller Area Network) interface, CXPI (Clock extension Peripheral Interface), etc.

High bandwidth data subsystem 510 provides DMA (direct memory access) data transfers from LVDS (low-voltage differential signaling)/LVCMOS (low-voltage CMOS) input to USB output at speeds up to 10 Gbps for USB 3.2 Gen 2, 20 Gbps for USB 3.2 Gen 2×2 transfer rates, 40 Gbps for USB 4, etc. High bandwidth data subsystem 510 includes multi-layer DMA interconnect 524, SRAM 526 for buffering USB data, USB device 528 that includes one or more USB PHY (physical interface) 530 for implementing USB 2.X, 3.X, 4.X, etc. endpoints with transmission speeds of 480 Mbps, 5 Gbps, 10 Gbps, 20 Gbps, 40 Gbps, etc., one or more USB controllers 532 and related circuitry, and LVDS/LVCMOS subsystem 534 for providing an LVDS/LVCMOS interface.

In accordance with the SERDES techniques, slicers, and temperature offset cancelation circuits described herein, USB PHY 530 included in high bandwidth data subsystem 510 may include SERDES receiver 100 described with reference to FIG. 1, which may further include DFE 200 of FIG. 2 (e.g., a DFE with edge, data, error, and roam slicers). Each slicer of DFE 200 may correspond to slicer 300 of FIG. 3 and may include a temperature offset cancelation circuit. In an embodiment, USB PHY 530 may include more than one SERDES receiver 100. For example, USB PHY 530 may include two SERDES receives 100 to support two RX signals in USB 3.2 Gen 2×2. In various embodiments, aspects described herein with reference to FIGS. 1-4B may similarly or alternatively be included in LVDS/LVCMOS subsystem 534 or other subsystems of USB IC controller 500.

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "adjusting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, the use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "some embodiments" throughout is not intended to mean the same embodiment or embodiments unless described as such.

Embodiments described herein may also relate to an apparatus for performing the operations herein. This apparatus may be specially constructed for the required purposes, or it may comprise a general-purpose computer selectively activated or reconfigured by firmware. Such firmware may be stored in a non-transitory computer-readable storage medium, such as, but not limited to, device registers, read-only memories (ROMs), random access memories (RAMs), EPROMS, EEPROMs, flash memory, or any type of media suitable for storing electronic instructions. The term "computer-readable storage medium" should be taken to include a single medium or multiple media that store one or more sets of instructions. The term "computer-readable medium" shall also be taken to include any medium capable of storing, encoding, or carrying a set of instructions for execution by the machine or device and that causes the machine/device to perform any one or more of the methodologies of the present embodiments. The term "computer-readable storage medium" shall accordingly be taken to include, but not be limited to, solid-state memories, optical media, magnetic media, and any medium that is capable of storing a set of instructions for execution by the machine/device and that causes the machine/device to perform any one or more of the methodologies of the present embodiments.

The algorithms and displays presented herein are not inherently related to any particular device or other apparatus. Various systems (e.g., system-on-chip (SoC)) may be used with firmware in accordance with the teachings herein, or it may prove convenient to construct a more specialized device or apparatus to perform the required method steps. The required structure for a variety of these systems will appear from the description herein. In addition, the present embodiments are not described with reference to any particular programming language. It will be appreciated that a variety of programming languages may be used to implement firmware consistent the teachings of the embodiments as described herein.

The above description sets forth numerous specific details, such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or presented in simple block diagram format to avoid unnecessarily obscuring the present disclosure. Thus, the specific details set forth above are merely exemplary. Particular embodiments may vary from these exemplary details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

In the above description, for purposes of explanation, numerous specific details are set forth in order to provide a thorough understanding of the present disclosure. It will be evident, however, to one skilled in the art that the present disclosure may be practiced without these specific details. In other instances, well-known circuits, structures, and techniques are not shown in detail, but rather in a block diagram in order to avoid unnecessarily obscuring an understanding of this description.

Reference in the description to "one embodiment," "an embodiment," or "some embodiments" means that a particular feature, structure, or characteristic described in connection with the embodiment(s) is included in at least one embodiment of the disclosure. The phrase "in one embodiment" or "in some embodiments" located in various places in this description does not necessarily refer to the same embodiment(s).

What is claimed is:

1. A slicer of a decision feedback equalizer (DFE), the slicer comprising:
   an integrator circuit comprising a first transistor associated with a first temperature-dependent beta value;
   a regenerator circuit coupled to the integrator circuit;
   a temperature offset cancelation circuit coupled to the regenerator circuit wherein the temperature offset cancelation circuit comprises:
      a second transistor associated with a second temperature-dependent beta value;
      a pair of first and second resistors, wherein the first resistor is coupled to the second transistor, and wherein the pair of first and second resistors is to modify the second temperature-dependent beta value to correspond to the first temperature-dependent beta value of the first transistor; and
      a third transistor coupled to the pair of first and second resistors, the third transistor to provide a bias current for canceling a temperature offset of the first transistor.

2. The slicer of claim 1, wherein:
   a source terminal of the second transistor is coupled to a source terminal of the third transistor and the second resistor;
   a gate terminal of the second transistor is coupled to a drain terminal of the second transistor and the first resistor; and
   a gate terminal of the third transistor is coupled to the first resistor, the second resistor, and an input current source.

3. The slicer of claim 2, wherein the input current source is a programmable current source.

4. The slicer of claim 1, wherein:
   the first transistor is associated with a fourth transistor in a differential pair; and
   the fourth transistor is associated with a second temperature offset cancelation circuit corresponding to the temperature offset cancelation circuit.

5. The slicer of claim 1, wherein the first transistor, the second transistor, and the third transistor are n-type metal-oxide-semiconductor (NMOS) transistors.

6. The slicer of claim 1, wherein the modification of the second temperature-dependent beta value is approximated by a product of the second temperature-dependent beta value and a quotient of a sum of the first and second resistors and the second resistor.

7. The slicer of claim 1, wherein:
   the first transistor corresponds to fourth, fifth, and sixth transistors of respective second, third, and fourth slicers;
   a summer of the DFE is coupled to each of the slicer and the second, third, and fourth slicers via the first, fourth, fifth, and sixth transistors; and
   the first, fourth, fifth, and sixth transistors are to load the summer less than a threshold loading value.

8. The slicer of claim 1, wherein:
   the temperature offset cancelation circuit is coupled to a fourth transistor of the regenerator circuit;
   the fourth transistor of the regenerator circuit is coupled to the first transistor of the integrator circuit; and
   the fourth transistor isolates the regenerator circuit from the integrator circuit.

9. A temperature offset cancelation circuit comprising:
   a first transistor associated with a first temperature-dependent beta value;
   a pair of first and second resistors, wherein the first resistor is coupled to the first transistor, and wherein the pair of first and second resistors is to modify the first temperature-dependent beta value to correspond to a second temperature-dependent beta value; and
   a second transistor coupled to the pair of first and second resistors, the second transistor to provide a bias current.

10. The temperature offset cancelation circuit of claim 9, wherein:
    a source terminal of the first transistor is coupled to a source terminal of the second transistor and the second resistor;
    a gate terminal of the first transistor is coupled to a drain terminal of the first transistor and the first resistor; and
    a gate terminal of the second transistor is coupled to the first resistor, the second resistor, and an input current source.

11. The temperature offset cancelation circuit of claim 10, wherein the input current source is a programmable current source.

12. The temperature offset cancelation circuit of claim 9, wherein the first transistor and the second transistor are n-type metal-oxide-semiconductor (NMOS) transistors.

13. The temperature offset cancelation circuit of claim 9, wherein the modification of the first temperature-dependent beta value is approximated by a product of the first temperature-dependent beta value and a quotient of a sum of the first and second resistors and the second resistor.

14. A Universal Serial Bus (USB) Physical Layer (PHY) of a USB system, the USB PHY comprising:
 a decision feedback equalizer (DFE) comprising:
  a summer; and
  a slicer, the slicer comprising:
   an integrator circuit comprising a first transistor, wherein the first transistor is associated with a first temperature-dependent beta value;
   a regenerator circuit coupled to the integrator circuit;
   a temperature offset cancelation circuit coupled to the regenerator circuit, wherein the temperature offset cancelation circuit comprises:
    a second transistor associated with a second temperature-dependent beta value;
    a pair of first and second resistors, wherein the first resistor is coupled to the second transistor, and wherein the pair of the first and second resistors is to modify the second temperature-dependent beta value to correspond to the first temperature-dependent beta value of the first transistor; and
    a third transistor coupled to the pair of first and second resistors, the third transistor to provide a bias current for canceling a temperature offset of the first transistor.

15. The USB PHY of claim 14, wherein:
 a source terminal of the second transistor is coupled to a source terminal of the third transistor and the second resistor;
 a gate terminal of the second transistor is coupled to a drain terminal of the second transistor and the first resistor; and
 a gate terminal of the third transistor is coupled to the first resistor, the second resistor, and an input current source.

16. The USB PHY of claim 15, wherein the input current source is a programmable current source.

17. The USB PHY of claim 14, wherein:
 the first transistor is associated with a fourth transistor in a differential pair; and
 the fourth transistor is associated with a second temperature offset cancelation circuit corresponding to the temperature offset cancelation circuit.

18. The USB PHY of claim 14, wherein the modification of the second temperature-dependent beta value is approximated by a product of the second temperature-dependent beta value and a quotient of a sum of the first and second resistors and the second resistor.

19. The USB PHY of claim 14, wherein:
 the first transistor corresponds to fourth, fifth, and sixth transistors of respective second, third, and fourth slicers;
 the summer is coupled to each of the slicer and the second, third, and fourth slicers via the first, fourth, fifth, and sixth transistors; and
 the first, fourth, fifth, and sixth transistors are to load the summer less than a threshold loading value.

20. The USB PHY of claim 14, wherein:
 the temperature offset cancelation circuit is coupled to a fourth transistor of the regenerator circuit;
 the fourth transistor of the regenerator circuit is coupled to the first transistor of the integrator circuit; and
 the fourth transistor isolates the regenerator circuit from the integrator circuit.

\* \* \* \* \*